United States Patent

[11] 3,609,671

| [72] | Inventors | Richard B. Webster<br>Winter Park;<br>Michael T. Marrero, Casselberry, both of Fla. |
|---|---|---|
| [21] | Appl. No. | 21,899 |
| [22] | Filed | Mar. 23, 1970 |
| [45] | Patented | Sept. 28, 1971 |
| [73] | Assignee | The United States of America as represented by the Secretary of the Navy |

[54] ACTIVE SUBMARINE TARGET ECHO SYNTHESIZER
6 Claims, 2 Drawing Figs.

[52] U.S. Cl. ..................................................... 340/3 E, 35/10.4, 340/5 D
[51] Int. Cl. ..................................................... G01s 9/66, G09b 9/00
[50] Field of Search ........................................... 340/2, 3, 3 E, 5, 5 D; 35/10.4

[56] References Cited
UNITED STATES PATENTS

| 2,887,671 | 5/1959 | Frankel et al. ............... | 340/3 |
| 3,555,165 | 1/1971 | Ettenhofer et al. ........... | 35/10.4 |

Primary Examiner—Richard A. Farley
Attorneys—Richard S. Sciascia and John W. Pease

ABSTRACT: Apparatus wherein an active incoming sonar signal is synthesized by means including a spaced array of receiver transducers to provide a carrier frequency and a digital signal, said digital signal being applied to address a memory means including a core memory in which submarine signatures are stored for retrieval in relation to the type of submarine and aspect angle thereof and which also includes a digital to analog converter means. The outputs of said analog converter means being applied to modulate a carrier wave signal derived from a tone burst to carrier wave converter and further modulated by range data from a range translator to activate transducer means to provide a reflected submarine target sonar signal representative of a selected type submarine at an aspect angle and range corresponding to said incoming active sonar signal.

Fig. 2

Target Aspect Angle Address

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 |   |   |   |   |   |   |   |   |   |    |    |    |    |    |    |    |
| 2 |   |   |   |   |   |   |   |   |   |    |    |    |    |    |    |    |
| 3 |   | C |   |   |   |   |   |   |   |    |    |    |    |    |    |    |
| 4 |   |   |   |   |   |   |   |   |   |    |    |    |    |    |    |    |
| 5 |   |   |   |   |   |   |   |   |   |    |    |    |    |    |    |    |
| 6 |   |   |   |   |   |   |   |   |   |    |    |    |    |    |    |    |
| 7 |   |   |   |   |   |   |   |   |   |    |    |    |    |    |    |    |
| 8 |   |   |   |   |   |   |   |   |   |    |    |    |    |    |    |    |
| 9 |   |   |   |   |   |   |   |   |   |    |    |    |    |    |    |    |
| 10|   |   |   |   |   |   |   |   |   |    |    |    |    |    |    |    |

Target Class Address

Richard B. Webster
Michael T. Marrero
INVENTORS

BY

Attorney

ACTIVE SUBMARINE TARGET ECHO SYNTHESIZER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This apparatus embodies a Tone Burst to Frequency Generator described in U.S. application Ser. No. 827,597, filed May 26, 1969 by inventor Michael T. Marrero.

BACKGROUND OF THE INVENTION

This invention relates to that portion of the field of electronic simulation devices in which there is required for training purposes the generation of submarine sonar signatures representative of selected types of submarines and range and aspect of the selected type submarine.

In the past, the active sonar echo of a pseudo submarine has been simulated by tape recorder techniques. This prior art technique involves amplifying and elongating the original sonar signal by a direct recording and time delayed playback of the signal. The length of the returning echo is controlled in steps to simulate the target echo originating from the bow, beam, or stern quarter.

A basic disadvantage of this approach lies in the complexity and instability of tape recorders as related to desired accuracy of signal. Fixed elongation delays must be set by the tape recorder speed, which is inherently unstable. Also, high interaction between the receive and transmit transducers in this arrangement reduces fidelity. As a prior art alternative, only a real time amplification, distortion and retransmission of the original receive signal may be used. However, this approach does not provide for pulse length variation with target aspect.

SUMMARY OF THE INVENTION

In accordance with the subject invention, the above-mentioned disadvantages are eliminated to provide a more realistic, accurate signature by providing apparatus capable of accepting an incoming active sonar signal and of selecting responsive thereto from a core memory including a digital to analog converter, the proper signal return corresponding to a selected type submarine, at proper range and aspect. Output from the digital to analog portion of the core memory is passed to an amplitude modulator to modulate a carrier wave derived from the incoming sonar signal through a tone burst to CW converter and is thereafter further modulated in a range modulator deriving a range signal from the input sonar signal from a range translator. The output from the range modulator is passed to a transducer providing the return sonar signal representative of the actual selected submarine signature.

Description of the Drawings

FIG. 2 is a graphic representation of address entry to the core memory portion of FIG. 1. Description of the Preferred Embodiment Referring to FIG. 1 of the drawing, an incoming active sonar signal indicated at A is received by a transducer array 10 comprising receiver transducers 12 and 14. In order to obtain aspect information, the transducers 12 and 14 are separated by a distance "d" indicated. The signal from each transducer is passed on respective lines 16, 18 and 20 and lines 22, 24 and 26 through a transreceiver switch 30 and amplifier 32 to an aspect encoder 34.

Figure 1:
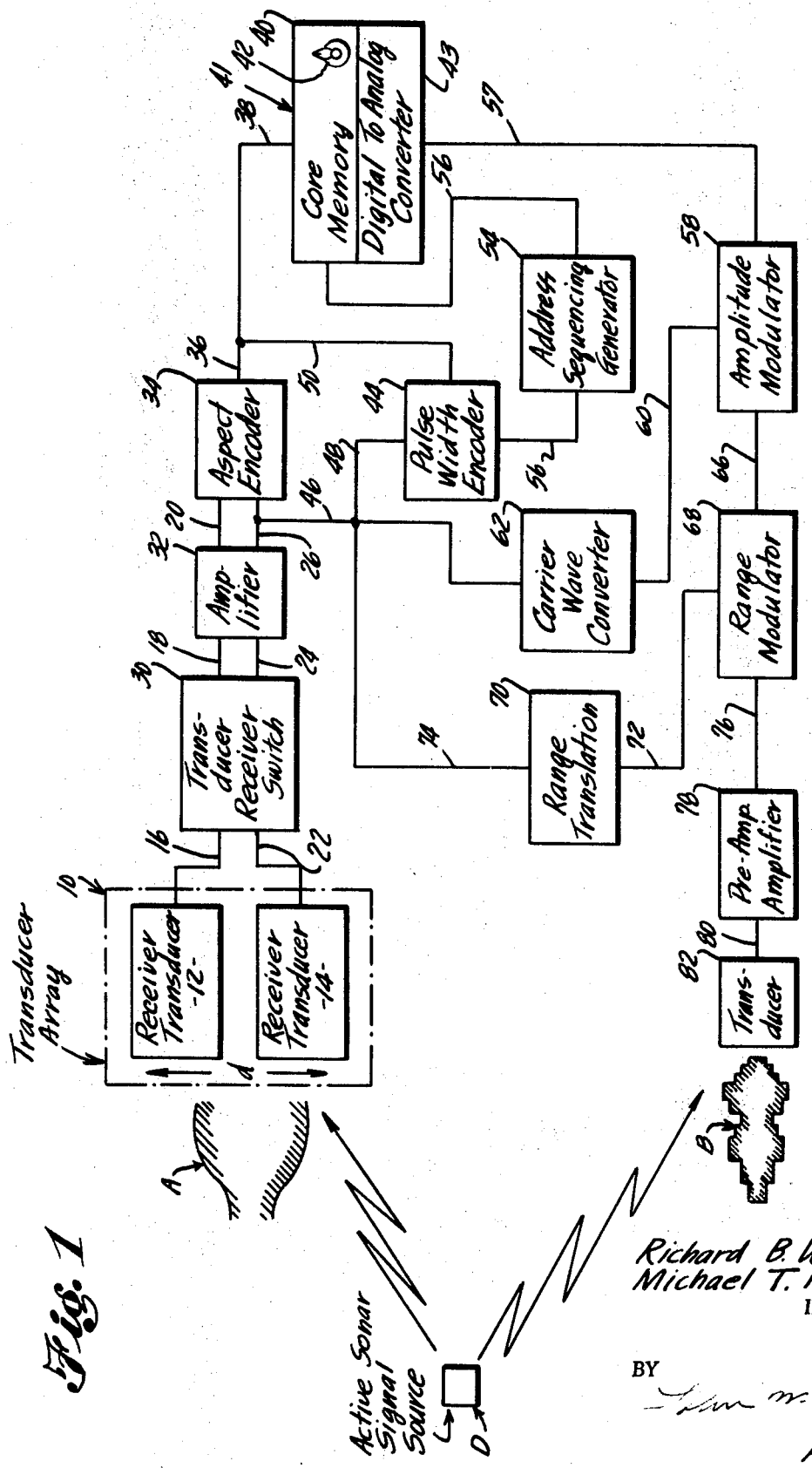
FIG. 1 is a block diagram of an overall system incorporating the invention.

The signal from each receiver transducer is related to the signal from the other receiver transducer by a delay proportional to $d \cos \theta$, where $\theta$ is the aspect angle. The delay is measured digitally by the aspect encoder. The output signal of the aspect encoder, passed on lines 36 and 38 to a core memory portion 40 of a memory means 41, is the address signal for location of the particular cell of the core memory corresponding to that aspect angle. The memory means 41 includes the core memory portion 40 and a digital to analog converter portion 43. The core memory includes, as shown graphically in FIG. 2, a matrix of individual cells. The horizontal rows of cells indicated by the vertically arranged numerals indicate various classes, i.e. types, of submarines. The vertical rows of cells indicated by the horizontally arranged numerals indicate 16 different aspect angle addresses for each of the targets 1 through 10. Thus, for example, the core memory cell C is the correct address for a target of class 3 with an aspect angle indicated by row 2 of the aspect angle address.

The correct signal to be obtained from the core memory is thus determined by the factor, class of submarine and the factor, aspect angle of the submarine. The class of submarine is preselected by suitable programming means such as a switch 42 shown on the core memory 40 in FIG. 1, to preselect any one of the 10 target classes shown FIG. 2. The aspect angle entry address is obtained from the output of the aspect encoder 34.

Each signal return to be stored is divided into 16 equal intervals of time. The average amplitude of each interval is stored digitally in the core memory 40. Each stored interval occupies one four-bit word in the memory. Therefore, each signal occupies 16 four-bit words. Each signal represents one particular aspect angle of one particular target. We have arbitrarily chosen to have 16 different aspect angles to choose from in the 0 to 360° for each target class. The aspect encoder provides an output of one polarity when the incoming active sonar signal strikes transducer 12 first, and thereafter strikes transducer 14 and provides an opposite polarity when the incoming signal strikes transducer 14 first, and thereafter strikes transducer 12. Thus, we have 32 aspect angle outputs from the core memory for the 360° of aspect, giving a signal for each 11.25 degrees.

A pulse width encoder 44 is provided to receive input signals from output line 26 of amplifier 32 on lines 46 and 48, and from output line 36 of the aspect encoder 34 on line 50 to develop and pass on a line 52 to an address sequencing generator 54 a signal representative of input pulse width, aspect angle and length of target. The address sequence generator 54 is connected to the core memory 40 by line 56. The rate at which the information in each cell of the core memory 40 is read out depends upon the factors of input pulse width, aspect angle, and length of target. The output pulse to the core memory 40 is defined as $2l/c\cos \theta + PW$ where $l$ is the target length, $\theta$ is the aspect angle, $c$ is the velocity of sound in water, and PW is the input pulse width.

The pulse width encoder 44 measures the input pulse width and adds the aspect information from the aspect encoder 34. The address sequence generator 54 responds to the output signal form the pulse width encoder 44 to generate a series of 16 pulses. These pulses read out the 16 words of the signal in sequence from the chosen cell in the core memory 40. Each word output is converted to analog form by the digital to analog conversion portion 43 of the memory means 41 and the resulting analog signal is passed on a line 57 to an amplitude modulator 58 to modulate a carrier frequency wave in the modulator 58. The carrier frequency wave is supplied to modulator 58 on line 60 form a tone burst to carrier wave converter 62 which receives its input from output line 26 of amplifier 32 via lines 46 and 64.

The once modulated carrier wave signal from the amplitude modulator 58 is passed on a line 66 to a range modulator 68 wherein the signal is further modulated by a range translator 70 connected by line 72 to the range modulator 68, the range translator deriving its input via lines 26, 46 and a line 74 from the amplifier 32.

The output of the range modulator 68 is passed on a line 76 through a preamp amplifier 78 and thence on a line 80 to a return signal sonar transducer 82 which develops an output signal indicated at B and representative of a particular submarine (target) at a specific correct aspect angle and range determined from the active input sonar signal A.

OPERATION

Operation of the simulator should be apparent from the description given above, however, a brief summary of the operation including specific values may be useful in providing a better understanding.

Having the above in mind, let us assume initial conditions for the system as follows: $d/c=50$ μsec.; $\theta=+45°$; $d/c \cos \theta=35$ μsec.; PW=250 millisec.; $\mu=100$ yards; and Carrier Signal Frequency = 5 kHz.

In operation, the incoming active sonar signal A is received by transducers 12 and 14 in time concurrence or sequence, depending upon the aspect angle of the target from the active signal source D. The transducer receiving switch 30 is closed. The signals from transducers 12 and 14 are amplified in amplifier 32 and respectively transmitted to the aspect encoder 34.

The aspect encoder 34 converts $d/c \cos \theta$ into digital format, which in the specific case selected encodes into a four-bit word of 0110. This four-bit word is used as part of the address for the core memory portion 40 of unit 41, thus addressing a specific cell of the core memory matrix as shown in FIG. 2. The above-mentioned digital word from the aspect encoder 34 is also processed by the pulse width encoder 44 and properly scaled by the factor $2l/c$, and is encoded into a digital number, which in the specific case is 001100000.

The pulse width is measured by the pulse width encoder 44 and the result is measured digitally. For the exemplary case, the pulse width is 011111010. The output pulse width is determined by the equation $2l/c \cos \theta$+PW. The two numbers are added digitally in the pulse width encoder 44, which results in the final output of 101011010,which implies an output pulse width of 346 millisec. This output from the pulse width encoder 44 is processed by the address sequence generator 54 which generates a set of 16 pulses at 21.6 millisec. intervals. The pulses are used as the read command for the core memory 40, and effect information retrieval from the core at the address specified by the aspect encoder 34 and the target classification manually programmed by the switch means 42. The information is then converted to analog form through the digital to analog converter portion 43 of unit 41. The analog information thus obtained is the envelope of the carrier signal to be transmitted back to the sender. The carrier signal, generated by the tone burst to carrier wave converter 62, must be exactly the same as the input carrier signal in the input transducers 12 and 14. The tone burst to carrier wave generator 62, fully described in U.S. application Ser. No. 827,597,filed May 26, 1969,operates by measuring the period of the incoming frequency, in this exemplary case being 200 microsec., and converting it to digital format, in this case being 0111110100. This digital number controls a variable oscillator portion of the converter 62 whose frequency is controlled by the digital number, thus generating the necessary carrier wave output. The carrier wave output and the analog envelope generated in unit 43 is processed through the amplitude modulator 58. The output signal of the modulator 58 is the required signal to be transmitted except for its overall power level. The power output is a function of the amount of power received by the input transducer. A measure of the input power is performed by the range translator 70. The output of the range translator 70 is an analog signal proportional to the power of the input signal. This output is used in conjunction with the output of the amplitude modulator 58 to again modulate the overall amplitude of the signal in a second modulator called the range modulator 68. The signal thus is scaled with respect to power. It is left now only for the signal to be amplified, as by preamplifier 78, and transmitted through the output transducer 82 in omnidirectional mode.

What I claim is:

1. An active submarine target echo synthesizer comprising:
   a. a receiver and aspect encoder circuit including an array of spaced receiver transducers, amplifying means and an aspect encoder for receiving active input sonar signals and providing a digital output signal representative of the aspect angle of said target from the source of said active sonar signal;
   b. memory means including a core memory and a digital to analog converter means;
   c. said core memory having a matrix of cells, each of specific output signal characteristics for a range of types of submarine targets and for specific aspect angle of the target;
   d. said core memory including manual means for preprogramming said core memory for a specific type of submarine and being connected to said aspect encoder for addressing said core memory for a specific aspect angle derived from said active sonar input signal;
   e. sequential pulse time gating means for said core memory for sequential activation of the cell addressed portions of said core memory to provide digital output signals from said cells to said digital to analog converter means;
   f. a carrier wave generator means connected to said receiving circuit amplifier means to provide a carrier wave of frequency corresponding to the frequency of said incoming active sonar signal;
   g. an amplitude modulator connected to said carrier wave generator and to the analog output of said digital to analog converter to modulate said carrier wave in accordance with the aspect angle of said target;
   h. range translation and modulator means connected to said amplitude modulator and to said receiver circuit to further modulate said carrier wave in accordance with the range of said target, derived from said active sonar signal input; and
   i. a reflective wave transducer means connected to said range modulator to provide a return sonar signal representative of the type of submarine target, its aspect angle and range.

2. Apparatus according to claim 1,
   a. said array of spaced receiver transducers consisting of a pair of transducers.

3. Apparatus according to claim 1,
   a. said sequential pulse time gating means including a pulse width encoder having inputs connected to the outputs of said aspect encoder and said receiver circuit amplifying means to provide a sequential series of output digital number signals, and
   b. an address sequence generator for receiving said series of output digital number signals for sequential pulse gating a cell of said core memory corresponding to said digital number.

4. Apparatus according to claim 1,
   a. said carrier wave generator means including a tone burst to frequency generator.

5. Apparatus according to claim 2,
   a. said sequential pulse time gating means including a pulse width encoder having inputs connected to the outputs of said aspect encoder and said receiver circuit amplifying means to provide a sequential series of output digital number signals, and
   b. an address sequence generator for receiving said series of output digital number signals for sequential pulse gating a cell of said core memory corresponding to said digital number.

6. Apparatus according to claim 5,
   a. said carrier wave generator means including a tone burst to frequency generator.